June 7, 1960  F. W. W. MORLEY ET AL  2,939,522
FUEL SYSTEMS OF GAS TURBINE ENGINES
Filed July 18, 1955
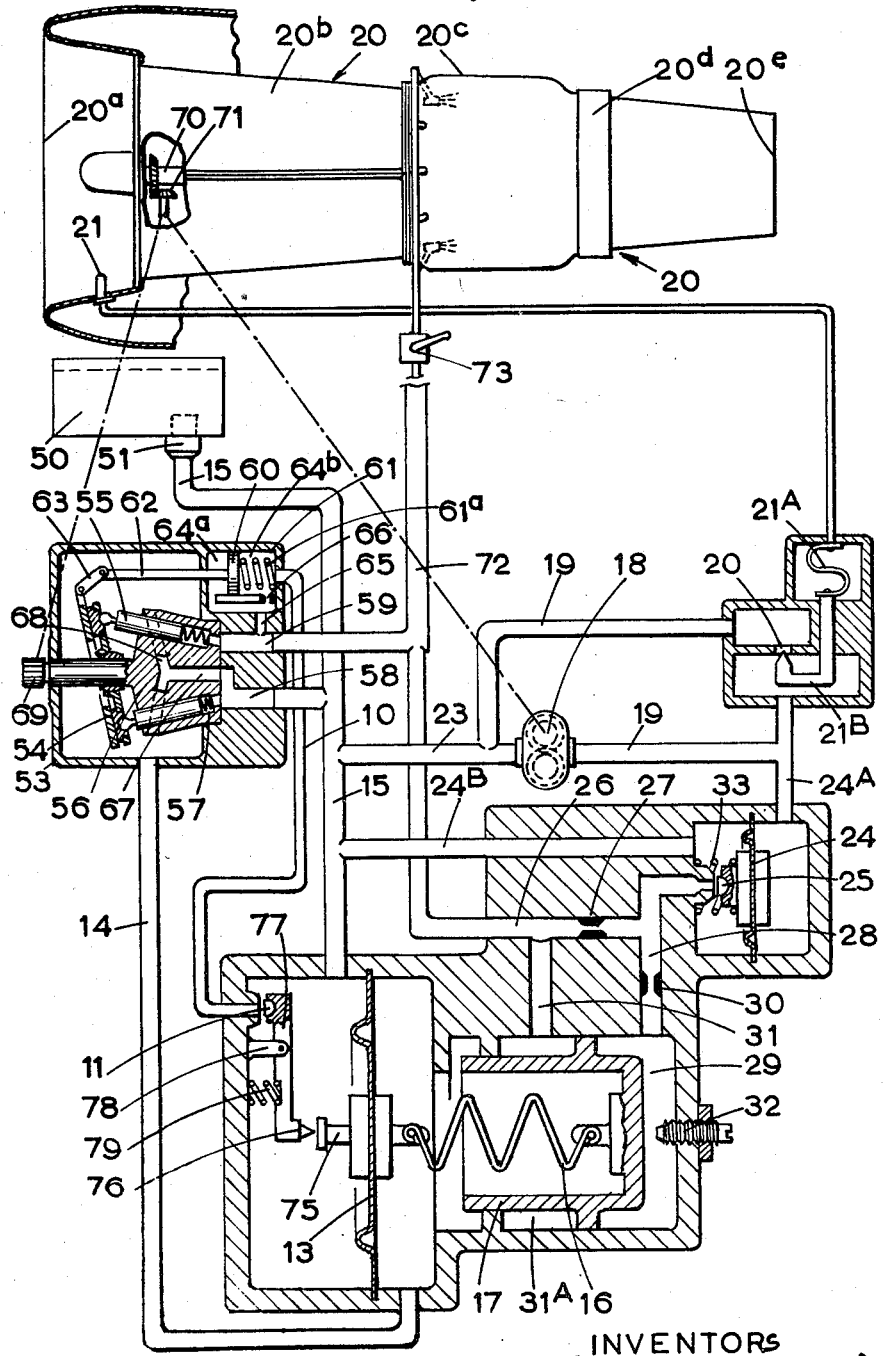
INVENTORS
Frederick William Walton Morley
Kenneth Arnold Basford
BY
Leech and Radue
ATTORNEYS

United States Patent Office 2,939,522
Patented June 7, 1960

---

2,939,522

FUEL SYSTEMS OF GAS TURBINE ENGINES

Frederick William Walton Morley, Castle Donington, and Kenneth Arnold Basford, Alvaston, England, assignors to Rolls-Royce Limited, Derby, England Filed July 18, 1955, Ser. No. 522,718

Claims priority, application Great Britain July 27, 1954

7 Claims. (Cl. 158—36.4)

This invention relates to fuel systems of gas-turbine engines and seeks to provide speed governor means arranged to control the engine in a desirable manner.

According to the present invention in a fuel system of a gas-turbine engine including speed governor means arranged to prevent the speed of the engine exceeding a preselected maximum value, said speed governor means comprises a pump of the fixed-volumetric-capacity kind driven at a speed proportional to the rotational speed of the engine and passing liquid through restricted orifice means the area of which is adjusted in accordance with the temperature of air entering the compressor of the gas-turbine engine, the pressure difference across said orifice means being applied to pressure-sensitive means effective to control the delivery of fuel to the engine, whereby a preselected value of $N/\sqrt{T}$ is not exceeded, where N is the actual rotational speed of the engine and T is the temperature at the inlet to the compressor system of the engine.

Preferably the invention is applied to fuel systems for gas turbine engines of the well-known kind in which a variable-volumetric-capacity pump e.g. a swash-plate type pump, includes fluid pressure servo means controlling the output of the pump e.g. by controlling the angularity of the swash-plate. Hitherto it has been the common practice to provide a pressure-sensitive device, e.g. a diaphragm subjected to a fluid pressure which is a function of the actual rotational speed of the engine (N), said diaphragm being loaded by means of a spring. The arrangement is such that when a certain preselected value of the engine rotational speed (N) is reached the diaphragm moves to actuate valve means controlling the fluid pressure of the pump servo system, thereby to reduce the fuel delivery by the pump.

In applying the present invention to this well-known system, the spring loading the diaphragm or equivalent has its loading varied by means of a piston device to which it is connected at one end, said piston device being movable by a fluid pressure servo system controlled by valve means actuated by the pressure-sensitive device subjected to a pressure difference across the orifice means which is varied in accordance with the compressor inlet temperature (T).

In the single attached figure of drawing is illustrated diagrammatically a preferred embodiment of the invention.

In the application of gas turbine engines to aircraft propulsion it is found that with reduction of intake temperature the engine may surge. Under conditions of unusually low temperature this surge can occur at an actual r.p.m. notably lower than that at which the engine is normally governed. The only practical way of avoiding this surging is to modify the internal aerodynamics of the turbine or compressor to allow a greater margin from surge. Such modifications nearly always result in a loss of efficiency of the turbine or compressor such that a greater weight of fuel is required to produce a given thrust, or a lower maximum thrust is obtained from a given engine.

Surging is highly undesirable because, due to the unstable operation of the engine, the thrust becomes unstable and the aircraft becomes partially uncontrollable.

In order to avoid the performance penalties associated with increasing the surge margin of an engine, which penalties would apply throughout its operating range of altitude and temperatures, and confining the limitation of performance only to those regimes of the operational use of the aircraft where surging would occur near maximum r.p.m., it is proposed to fit a $N/\sqrt{T}$ limiter so that for any intake temperature above the critical one, no performance penalty will arise with an engine of small surge margin, but where the intake temperature is low, the maximum r.p.m. of the engine is limited so that surging is prevented by keeping the r.p.m. low and accepting the resulting thrust penalty in this particular low intake temperature condition.

It is found by experience that the top speed surging characteristic of an engine at steady conditions is determined only by two things, the actual r.p.m., and the intake temperature, such that the value of $N/\sqrt{T}$ forms the unique value determining whether an engine surges or not. This value can be altered by alterations to the internal aerodynamics of the engine proper but only by methods which involve, in general, loss of performance or economy. Saying that $N/\sqrt{T}$ is a fixed limitation for a given engine configuration is exactly the same as saying that the pressure ratio of the compressor is limited and that the Mach number of the air over the blading is limited, since all the above are, for a given engine configuration, uniquely related one to the other under conditions of steady running. Thus a $N/\sqrt{T}$ control, a pressure ratio control, or an air Mach number control, measuring at certain parts of the blading of the compressor, all will give the same net result and produce the same limitation. From the performance point of view there is nothing to choose between them, but measurement of $N/\sqrt{T}$ is easiest.

The gas turbine engine is indicated generally at 20 and consists of a compressor 20b receiving air from the atmosphere via intake 20a and delivering air in the compressed state to combustion equipment 20c wherein it has fuel burnt in it. The products of combustion pass to a turbine 20d, the rotor of which drives the compressor, and, after leaving the turbine, the exhaust gases pass to atmosphere at high velocity through propelling nozzle 20e, thus producing a propulsive thrust on the engine.

The fuel system is basically of a well-known kind and includes a fuel tank 50 delivering fuel through a booster pump 51 and pipe 15 to a variable-capacity pump 53 of the swashplate type driven from the engine.

The pump comprises a swashplate 54 the angularity of which controls the stroke of pump plungers 55 mounted in the pump rotor 56 and caused to reciprocate by the swashplate in cooperation with springs 57 to draw in fuel through inlet duct 58 in the pump casing and pump it out through delivery duct 59.

A piston 60 in a cylinder 61 is connected by rod 62 and link 63 to vary the angularity of the swash plate 54 and is urged to increase the pump stroke by spring 61a.

The space 64a to one side of piston 60 is in communication with the delivery of the pump through a duct 65. The space 64b at the other side of the piston is in communication with the delivery of the pump through duct 65 and restriction 66, and fuel is bled from this space in a controlled manner through pipe 10 controlled by a half-ball valve 11.

It will be appreciated that when the restriction to flow through pipe 10 is decreased by opening the half-ball valve, pressure in space 64a will tend to overcome the spring 61a and move piston 60 in the direction to reduce the angularity of the swash plate and the delivery of the pump.

When the restriction to flow through pipe 10 is increased, pressure will build up in the space 64b, and this pressure and the load of spring 61a will accordingly tend to move the piston in the direction to increase the angularity of the swash plate and thus increase the delivery from the pump.

The pump rotor 56 is driven through a pinion 69 from the main rotor 70 of the engine through inter-engaging bevel pinions 71. The pump delivers through conduit 59 into a fuel control device 73 and then through duct 72 to the combustion equipment 20c of the engine.

In the arrangement shown, the pump rotor 56 also functions as a centrifugal impeller by reason of an axial bore 67 in register with the inlet duct 58 of the pump and radial passages 68 leading out of bore 67.

Rotation of the pump rotor will thus create a pressure inside the casing of pump 53 which will be a function of the speed of rotation of the pump, and therefore of the engine.

The pressure in the casing of pump 53 is communicated by a pipe 14 to one side of a diaphragm 13, the other side of which is in communication with the inlet of the pump through the pipe 15.

The diaphragm 13 carries a diaphragm rod 75 which bears on a point 76 of a lever 77 pivoted on a bracket 78 and carrying at its other end a half-ball valve 11 urged on to its seating at the end of pipe 10 by a spring 79.

The diaphragm 13 is loaded by a tension spring 16 and the parts function so that when the rotational speed (N) of the engine exceeds a predetermined value the pressure created by the passages 68 in the pump rotor 56 communicated by pipe 14 to the right-hand side of diaphragm 13 overcomes spring 16 whereby the diaphragm moves to raise valve 11 from its seating.

The parts of the drawing so far described illustrate the workings of a known form of fuel supply and governor system. In that system the right-hand end of spring 16 has a fixed anchorage.

In modifying the well-known system so far described in accordance with the present invention the spring 16 is anchored to a movable differential-area piston 17, whereby the position of the piston 17 determines the loading of the spring.

The adjustment of the piston 17 is controlled in the following manner:

A fixed-volumetric-capacity pump, e.g. a gear pump 18 is driven at a speed proportional to the rotational speed of the engine and delivers through ducting 19 containing a variable-area orifice 20, the area of which is adjustable by means of a temperature bulb 21 located in the inlet to the compressor of the gas-turbine engine and a Bourdon tube 21A connected with bulb 21 and carrying a needle valve 21b which controls the orifice. Downstream of the orifice 20 the ducting 19 leads back to the inlet connection 23 to the pump 18, this connection 23 leading from the pipe 15.

Pressure-sensitive diaphragm 24 is subjected to the pressure in ducting 19 at locations upstream and downstream respectively of the orifice 20 through pipes 24a and 24b. The diaphragm 24 supports half-ball valve 25 controlling the flow of servo pressure fluid from a duct 26. This duct 26 is connected to the delivery 59 of the fuel pump 53 and contains a restrictor 27 there being a connection 28 from the duct 26 downstream of the restrictor 27 to the space 29 on the larger-area side of the piston 17, the connection 28 containing an additional restrictor 30, and there being also a connection 31 from the duct 26 upstream of the restrictor 27 to the space 31a on the smaller-area side of the piston 17.

The piston is also subjected on an area equal to the difference of the two above-mentioned areas to the pressure which is a function of the speed of rotation of the engine, but this pressure is small in relation to the pressures in the duct 26 and may be neglected.

An adjustable stop 32 limits displacement of piston 17 in one sense. A spring 33 urges half-ball valve 25 to the open position.

It will be noted that if the valve 25 is closed pressure will build up in space 29 to equal that in space 31a and piston 17 will move to the left due to the different areas of the two sides of the piston thereby decreasing the load imposed on the diaphragm 13 by spring 16. If valve 25 opens the leakage of servo liquid from space 29 permits the piston 17 to move to the right under the load imposed by high-pressure servo liquid operating in annular cylinder space 31a. In this manner the loading imposed by the spring 16 is increased.

In the application of gas-turbine engines to aircraft propulsion the reduction in ambient air temperature at high altitude may result in a value of $N/\sqrt{T}$ being exceeded, which may cause the compressor of the engine to surge. Thus in the system described the normal top speed governor, which operates at a given actual rotational speed N of the engine, may be operative at ground level and low altitude, the piston 17 resting against the adjustable stop 32 by virtue of the valve 25 being open under the influence of spring 33. However, when the hydraulic governor device comprising the pump 18 and orifice 20 gives rise to a preselected pressure drop, the valve 25 closes overcoming the loading of the spring 33, whereby the piston 17 moves to the left. In this manner the basic setting at which the speed governor operates is modified, the loading of the spring 16 which determines the actual speed at which the governor operates being reduced when the pressure drop across orifice 20, which is itself a function of $N/\sqrt{T}$ exceeds a preselected value. The system may thus be arranged to operate so that at high altitude it prevents a preselected value of $N/\sqrt{T}$ being exceeded.

Thus the apparatus disclosed herein is effective to limit the $N/\sqrt{T}$ of an engine to below a preselected value. The flow (F) from gear pump 18 varies as N; the pressure drop across the temperature controlled orifice 20 varies as $(F/A)^2$ (where A is the area of the orifice), and this varies as $(N/A)^2$. It is a comparatively simple matter to profile the needle 20 so that A varies as the square root of T and thus the pressure drop will vary as $(N/\sqrt{T})^2$. The apparatus is not required to exert a progressive control with varying values of $N/\sqrt{T}$ but to act only when a predetermined value tends to be exceeded. Thus once the predetermined pressure drop across orifice 20 occurs, valve 25 reduces the bleed of fuel from passage 28 and pressure on the right end of piston 17 predominates and the latter moves to the left until pressures on opposite sides of the flange on the piston balance. The movement of the piston thus selects the top speed of the engine for the predetermined value of $N/\sqrt{T}$.

It is immaterial that the pressure drop varies as $(N/\sqrt{T})^2$, as only one particular pressure drop is in question, i.e. that corresponding to the preselected value of $N/\sqrt{T}$ and therefore correspondingly equal to the preselected value of $(N/\sqrt{T})^2$. Similarly, the known top speed governor responds to a particular value of a pressure which varies as $N^2$, that particular value of pressure corresponds to a particular N.

This invention not only permits it to be arranged that the preselected value of $N/\sqrt{T}$ is not exceeded, which is desirable to prevent for example an excess compressor delivery pressure being reached, but also the engine is prevented by the top speed governor from running at an excessive speed which might be reached on a hot day (i.e. where the temperature at the inlet of the compressor is high) which might result in excessive centrifugal stresses in the engine.

What we claim is:

1. The combination with a gas turbine engine and a fuel system therefor having speed governor means operative to reduce the supply of fuel to the engine to prevent the speed of the engine exceeding a preselected maximum value, said governor means including resilient biasing means rendering said governor inoperative at low and normal engine speeds and arranged to be overcome at said preselected maximum value of engine speed, of fluid pressure responsive servo means for varying the value of the bias, a supply of pressure fluid to said servo means, means adapted for operation by engine conditions to produce a second fluid pressure which is a function of N and T, where N is engine rotational speed and T is engine intake temperature, means sensitive to said second fluid pressure to control the pressure of the fluid supplied to said servo means to cause said means to adjust the bias to have one fixed value when said second fluid pressure is below a preselected value and a second and lower value when said preselected value of said second fluid pressure is exceeded thus to render said governor operative at one preselected value of engine speed when $N/\sqrt{T}$ is below a preselected value and operative at a second and lower value of engine speed when said preselected value of $N/\sqrt{T}$ is exceeded.

2. A fuel system as claimed in claim 1 wherein said fluid pressure responsive servo means comprises a differential-area piston slidable in a stepped cylinder between two limiting positions, a connection conveying pressure fluid to the smaller-area side of said piston, a connection containing a flow restrictor conveying said pressure fluid to the larger-area side of the piston, a vent from said larger-area side having an orifice, a valve controlling said orifice and connected for actuation by said means sensitive to said second fluid pressure which is a function of $N/\sqrt{T}$ in the sense to move said valve in the direction to close said orifice on increase of said second fluid pressure above said preselected value so that the fluid pressure load on the larger-area side of said piston preponderates and the piston moves to one of its limiting positions to give a first fixed value to the bias, and to move said valve in the direction to open said orifice on decrease of said fluid pressure below said preselected value so that the fluid pressure on the smaller-area side of the piston preponderates to move said piston to the other of its limiting positions to give a second fixed value to the bias.

3. The combination with a gas turbine engine, a fuel system therefor having a variable volumetric capacity pump arranged to be driven by said engine, a first fluid pressure servo means controlling the output of the pump and comprising bleed valve means, means driven by the engine to provide a fluid pressure which is a function of the rotational speed of the engine, a diaphragm subjected to said last mentioned pressure and loaded in opposition by a spring and adapted and arranged to operate said bleed valve means to reduce pump output when said fluid pressure load overcomes said spring load at a preselected value of engine rotational speed, of second fluid pressure servo means for adjusting the position of the anchorage of said spring comprising a differential-area piston, a cylinder in which said piston works, means connecting said spring to said piston, a first pressure fluid connection from the outlet of said pump to said cylinder to apply fluid pressure directly to the smaller-area side of said piston, a second pressure fluid connection from the outlet of said pump to said cylinder to apply fluid pressure to the larger-area side of said piston, a flow restrictor in the said second fluid connection, a vent from the larger-area side of said cylinder comprising an orifice, a valve member controlling the area of said orifice, means to produce a fluid pressure which is a function of $N/\sqrt{T}$, means sensitive to said last mentioned fluid pressure and arranged to actuate said valve in the sense of decreasing the orifice area on increase of said fluid pressure above a preselected value so that the fluid pressure load on said larger-area side of the piston preponderates and the piston moves to one of its limiting positons to adjust the spring load to have a first value, and in the sense of increasing said orifice area on decrease of said fluid pressure below said preselected value so that the fluid pressure on the smaller-area side of the piston preponderates and said piston is moved to the other of its limiting positions to adjust said spring load to a second and lower value.

4. A fuel system as claimed in claim 3 wherein said means producing a fluid pressure which is a function of $N/\sqrt{T}$ comprises a fixed capacity positive displacement pump driven by said engine so that its speed varies directly as engine speed, an orifice through which the whole of the output of said pump is passed, means sensitive to intake temperature of the engine, valve means cooperating with said orifice to vary the area thereof and actuated by said temperature sensitive means in the sense to increase the area of said orifice with increasing temperature and vice versa whereby the pressure drop across said orifice is a function of $N/\sqrt{T}$.

5. A fuel system as claimed in claim 4 wherein said means sensitive to said fluid pressure which is a function of $N/\sqrt{T}$ is a diaphragm in a chamber and means to apply the pressure drop across said temperature controlled orifice to the diaphragm.

6. A fuel system as claimed in claim 5 wherein there is a second flow restrictor, the first being between said pump outlet and said orifice and the second being between the larger-area side of the said cylinder and the said orifice.

7. A fuel system as claimed in claim 6 in which both said restrictors are in series between the pump outlet and the larger-area side of the said cylinder and the orifice is connected to a point between the restrictors.

References Cited in the file of this patent

UNITED STATES PATENTS

| 2,429,005 | Watson et al. | Oct. 14, 1947 |
| 2,670,599 | Davies et al. | Mar. 2, 1954 |
| 2,750,734 | Anxionnaz | June 19, 1956 |
| 2,759,549 | Best | Aug. 21, 1956 |

FOREIGN PATENTS

| 580,149 | Great Britain | Aug. 8, 1946 |
| 647,585 | Great Britain | Dec. 20, 1950 |
| 677,006 | Great Britain | Aug. 6, 1952 |

OTHER REFERENCES

"Aircraft Jet Powerplants," 1951, by Franklin P. Durham, published by Prentice-Hall, Inc., N.Y., page 130.